No. 690,756. Patented Jan. 7, 1902.
J. F. McNUTT.
CONTROLLING MECHANISM FOR MOTOR VEHICLES.
(Application filed June 22, 1901.)
(No Model.) 2 Sheets—Sheet 1.
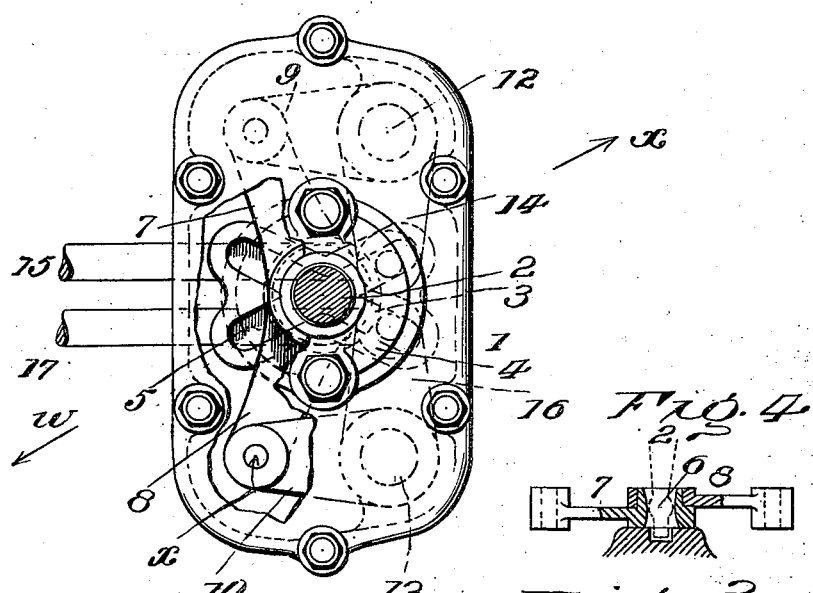
Fig. 1.
Fig. 4.
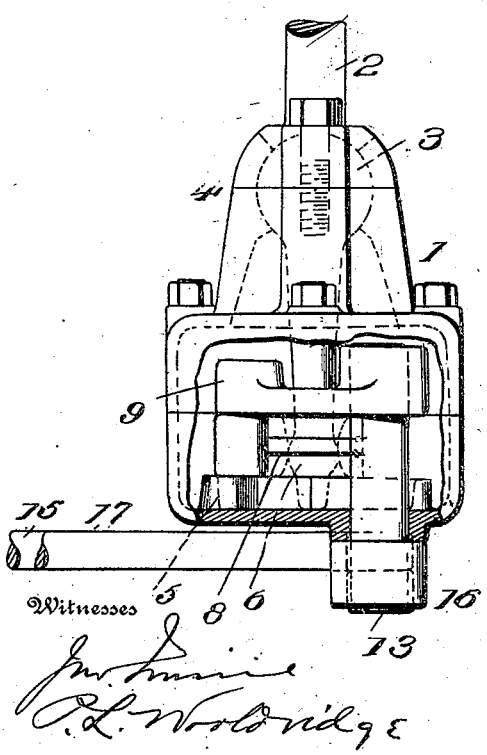
Fig. 2.
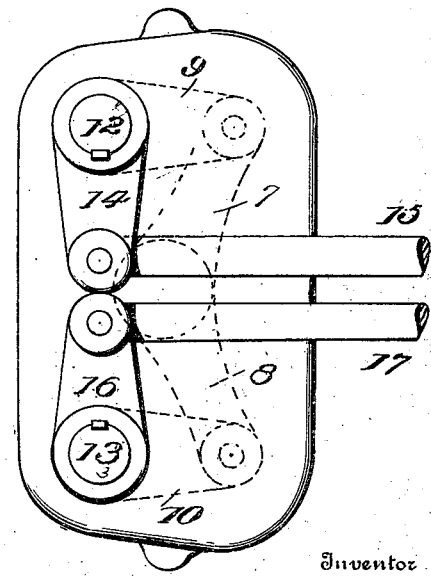
Fig. 3.
Witnesses
Inventor
John F. McNutt
By
Attorney No. 690,756. Patented Jan. 7, 1902.
J. F. McNUTT.
CONTROLLING MECHANISM FOR MOTOR VEHICLES.
(Application filed June 22, 1901.)
(No Model.) 2 Sheets—Sheet 2.

Witnesses
Inventor
J. F. McNutt.
By
Attorney

UNITED STATES PATENT OFFICE.

JOHN FRANKLIN McNUTT, OF CINCINNATI, OHIO.

CONTROLLING MECHANISM FOR MOTOR-VEHICLES.

SPECIFICATION forming part of Letters Patent No. 690,756, dated January 7, 1902.

Application filed June 22, 1901. Serial No. 65,705. (No model.)

*To all whom it may concern:*

Be it known that I, JOHN FRANKLIN MC-NUTT, of Cincinnati, in the county of Hamilton and State of Ohio, have invented certain new and useful Improvements in Controlling Mechanism for Motor-Vehicles; and I do hereby declare the following to be a full, clear, and exact description of the invention, such as will enable others skilled in the art to which it appertains to make and use the same.

This invention contemplates improvements in motor-vehicles, and has special reference to means for operating the brake and the clutches controlling the several gears by which the speed and reversal of the machine are regulated.

The primary object of the invention is to enable the machine to be controlled, so far as the speed and reversed gears and the brake are concerned, by a single lever which may be instantly moved at the will of the operator without delay or causing jogs.

A further object is to provide means whereby a single lever may actuate either of two controlling-rods independently without disturbing the other, which will remain locked as against accidental displacement.

The invention will be hereinafter fully set forth, and particularly pointed out in the claims.

Figure 5:
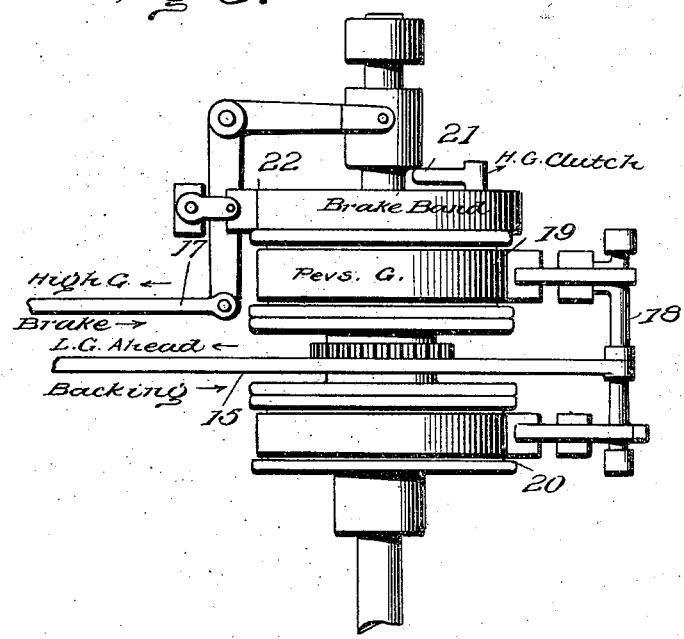
Figure 6:
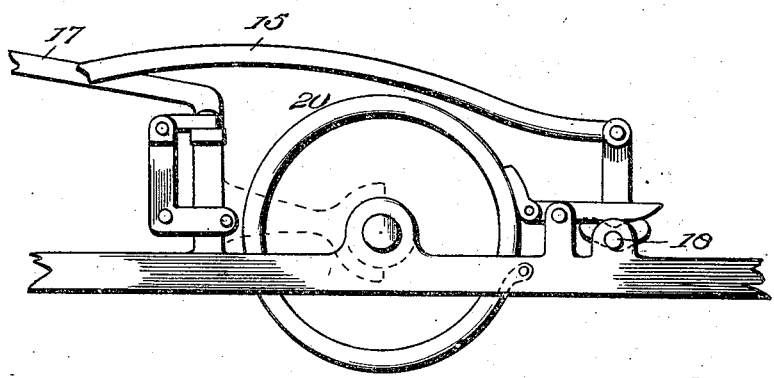

In the accompanying drawings, Figure 1 is a plan view with part of the cover of the inclosing case broken away. Fig. 2 is an end elevation with a portion of the case broken away. Fig. 3 is a bottom plan view. Fig. 4 is a detail. Fig. 5 shows in plan motor mechanism to which the controlling-rods may be connected. Fig. 6 is an end view thereof.

Referring to the drawings, 1 designates the inclosing case, which is made dust-proof and designed to be secured to the under side of the vehicle. Into this case extends a hand-lever 2, fulcrumed by a ball-joint 3 in a socket-casing 4, so that the lever will have a universal fulcrum-bearing, permitting movement of the lever in any desired direction. The inner end of the lever works in an X-shaped groove 5 on the bottom of the case, by which the movements of the lever are guided. The central intersecting point of the grooved branches is in direct line with the lever when perpendicular. Near its inner end the lever has a rounded knuckle 6, which fits in a hole in one end of a link 7. To this end of the link is secured the inner end of a second corresponding link 8. At their outer ends these two links are connected, respectively, to arms 9 and 10, fast on short shafts 12 and 13, which project through the bottom of the case. The shaft 12 is connected by an arm 14 to a rod 15, while the shaft 13 is connected by an arm 16 to a rod 17.

The rods 15 and 17 control the brake and the clutches of the different gears, the rod 15 when moved in opposite directions controlling, first, the low gear, and, second, the reverse gear, while the opposite movements of rod 17 effect, respectively, first, the throw-in of the high gear, and, second, the application of the brake. These longitudinal movements of the controlling-rods are effected through the operation of the lever, which will actuate only one rod at a time, and in doing so will not disturb the other. If the upper arm of the lever be thrown in the direction of arrow $w$, the link 8 will be moved in the direction of arrow $x$, drawing in the end of arm 10, which through its shaft 13 and arm 16 will so actuate rod 17 as to throw in the high gear. If the movement of the lever be reversed— that is, thrown at its outer end in the direction of arrow $x$—rod 17 will be moved to apply the brake. The movements of the lever in the other branches of the guiding-groove will actuate rod 15 to throw in one direction the low gear into operation and in the other the reverse-gear.

During the movement of the lever to actuate either link 7 8 the other link will move slightly, but not enough to affect the parts controlled by its respective rod. The movement of one controlling-rod renders the accidental actuation of the other impossible, since the lever is practically locked between its fulcrum and the guiding-groove.

To enable the practical application of my invention to be fully understood, I have shown in Figs. 5 and 6 rod 15 connected to a rock-shaft 18, the partial rotation of which in one direction will control the reversing-gearing (indicated at 19) and when moved in the opposite direction will throw in the low-speed gearing, (indicated at 20,) while the controlling-rod 17 is shown as equipped to throw in the high-gear clutch (indicated at 21) when moved in one direction and to apply the brake (indicated at 22) when moved in the opposite direction. The mechanism to which the controlling-rods may be connected forms no part of the present invention, and what has been said is intended merely as illustration.

The advantages of my invention are apparent. It will be seen that the lever may be instantly moved in any direction at the will of the operator without hesitation or causing jogs, and no matter how rapidly it is thrown the control of the rods is never lost. All of the working parts are located within the dust-proof case which is preferably partially filled with lubricant, so that the parts will be self-oiling.

I claim as my invention—

1. In a motor-vehicle, the combination with two independent sets of means controlling the brake, the low and high gears and the reverse-gear, each set performing a double function, of a single lever for independently actuating each set of means, as set forth.

2. In a motor-vehicle, the combination with two independent sets of means controlling the brake, the low and high gears and the reverse-gear, each set performing a double function, of a single lever for actuating each set of means, and means for holding one set practically immovable while the other set is being so actuated, substantially as set forth.

3. In a motor-vehicle, the combination with two rods for controlling the brake, the low and high gears and the reversing-gear, each rod performing a double function, of a single lever for actuating both rods, connecting means between the lever and each rod, and means for guiding the lever when actuating either rod, substantially as set forth.

4. In a motor-vehicle, the combination with the controlling means of the brake and gears, of a single lever having intermediate its ends a universal fulcrum-bearing, means with which such lever engages at one end for guiding the movements thereof, and independent means connected to the controlling means, each independently actuated by the lever without affecting the other means, substantially as set forth.

5. In a motor-vehicle, the combination with the controlling means of the brake and gears, of a single lever having a universal fulcrum-bearing, a double guide for the lever, independent sets of links, arms and shafts, connected to the controlling means, each set being practically inoperative as the other set is being actuated by the lever, substantially as set forth.

6. The combination with the two controlling rods, of the single lever having a universal fulcrum-bearing, two sets of links engaged by said lever, means for guiding the lever, and connections between the links and the rods, substantially as set forth.

7. The combination with the two controlling-rods, of the case having a double or intersecting groove therein, the lever fulcrumed on a universal bearing and having its end fitted in said groove, the two links engaged by said lever, the shafts, and connections between the shafts and links and between the shafts and rods, substantially as set forth.

8. The combination with the two controlling-rods, of the case having an X-shaped groove in its bottom, the lever having its inner end working in said groove, two links movable by said lever, arms to which the links are connected, shafts carrying said arms, and arms connecting said shafts to said rods, substantially as set forth.

In testimony whereof I have signed this specification in the presence of two subscribing witnesses.

JOHN FRANKLIN McNUTT.

Witnesses:
W. R. WOOD,
OLIVER B. KAISER.